United States Patent
Small et al.

(10) Patent No.: US 8,490,101 B1
(45) Date of Patent: Jul. 16, 2013

(54) THREAD SCHEDULING IN CHIP MULTITHREADING PROCESSORS

(75) Inventors: Christopher A. Small, Cambridge, MA (US); Alexandra Fedorova, Lincoln, MA (US); Daniel S. Nussbaum, Cambridge, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1727 days.

(21) Appl. No.: 10/999,169

(22) Filed: Nov. 29, 2004

(51) Int. Cl.
*G06F 9/46* (2006.01)

(52) U.S. Cl.
USPC .......................................... 718/103

(58) Field of Classification Search
USPC .......................................... 718/103
See application file for complete search history.

(56) References Cited

U.S. PATENT DOCUMENTS

| 6,243,788 B1* | 6/2001 | Franke et al. ..................... 711/3 |
| 6,338,130 B1* | 1/2002 | Sinibaldi et al. ................. 712/35 |
| 6,968,557 B1* | 11/2005 | Zhang et al. ................... 719/319 |
| 7,028,299 B1* | 4/2006 | Chang ........................... 718/104 |
| 7,053,901 B2* | 5/2006 | Huang et al. ................... 345/503 |
| 2005/0050534 A1* | 3/2005 | Luk et al. ....................... 717/159 |
| 2006/0072563 A1* | 4/2006 | Regnier et al. ................ 370/389 |

OTHER PUBLICATIONS

Exploiting Choice: Instruction Fetch and Issue on an Implementable Simultaneous Multithreading Processor Tullsen et al 23rd Annual International Symposium on Computer Architecture, May 1996.*
Denning, P. J., The Working Set Model for Program Behavior, Communications of the ACM, May 1968, pp. 323-333 (11 pages).

* cited by examiner

*Primary Examiner* — Mengyao Zhe
(74) *Attorney, Agent, or Firm* — Osha Liang LLP (57) ABSTRACT

A computer system includes an integrated circuit that has a plurality of processing cores fabricated therein and configured to perform operations in parallel. Each processing core is configured to process multiple threads, where a thread is assigned to one of the plurality of processing cores dependent on a cache hit rate of the thread.

10 Claims, 11 Drawing Sheets

THREAD SCHEDULING IN CHIP MULTITHREADING PROCESSORS

BACKGROUND OF INVENTION

Figure 1:
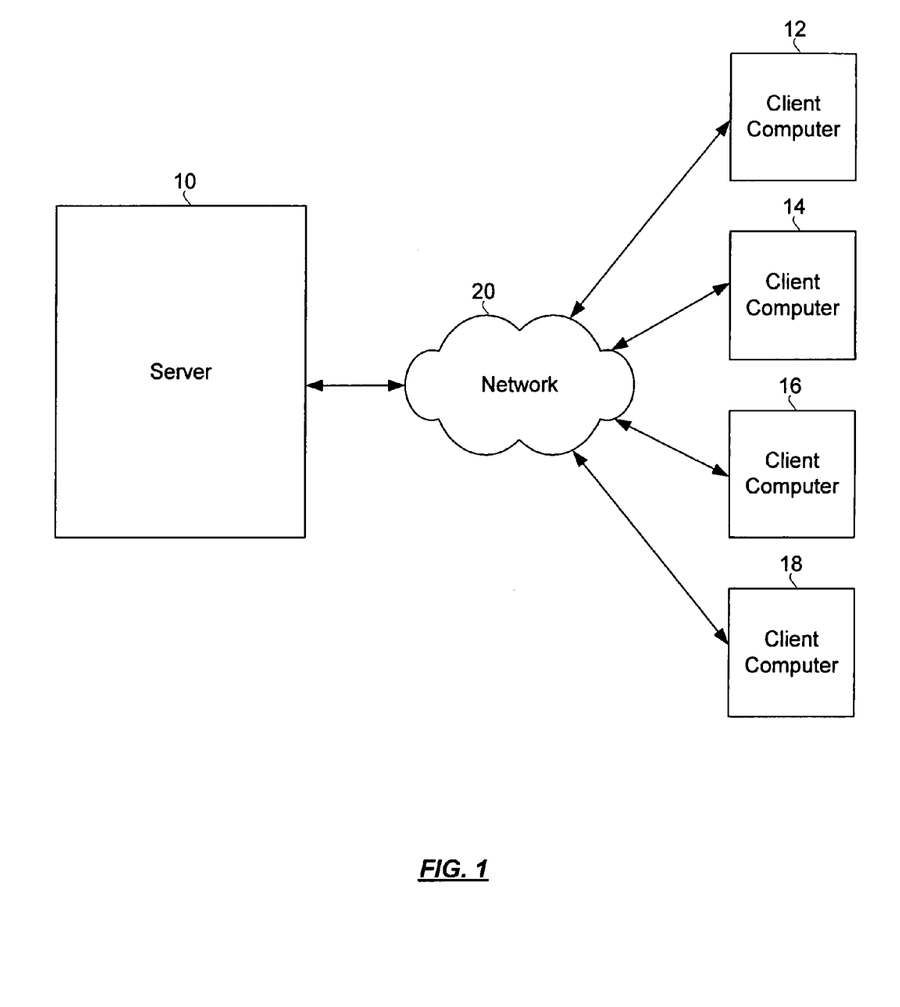
FIG. 1 shows a computer network.

In a typical computer network, a server computer 10 services requests from and provides data to client computers 12, 14, 16, 18 that are connected to the server computer 10 over a network (e.g., the Internet) 20. The server computer 10 may be used to store data, programs, etc. for use by the client computers 12, 14, 16, 18. Those skilled in the art will recognize that the server computers 10 may also be used to manage and control the client computers 12, 14, 16, 18.

In one example, an internet-based business may operate a server (or servers) to handle customer requests initiated at computer terminals located potentially thousands of miles away from the business's server(s). Each time a customer accesses the website of the business, an independent set of software instructions, i.e., a "thread," is executed by a processor of the business's server(s) to provide requested data to the customer.

Figure 2:
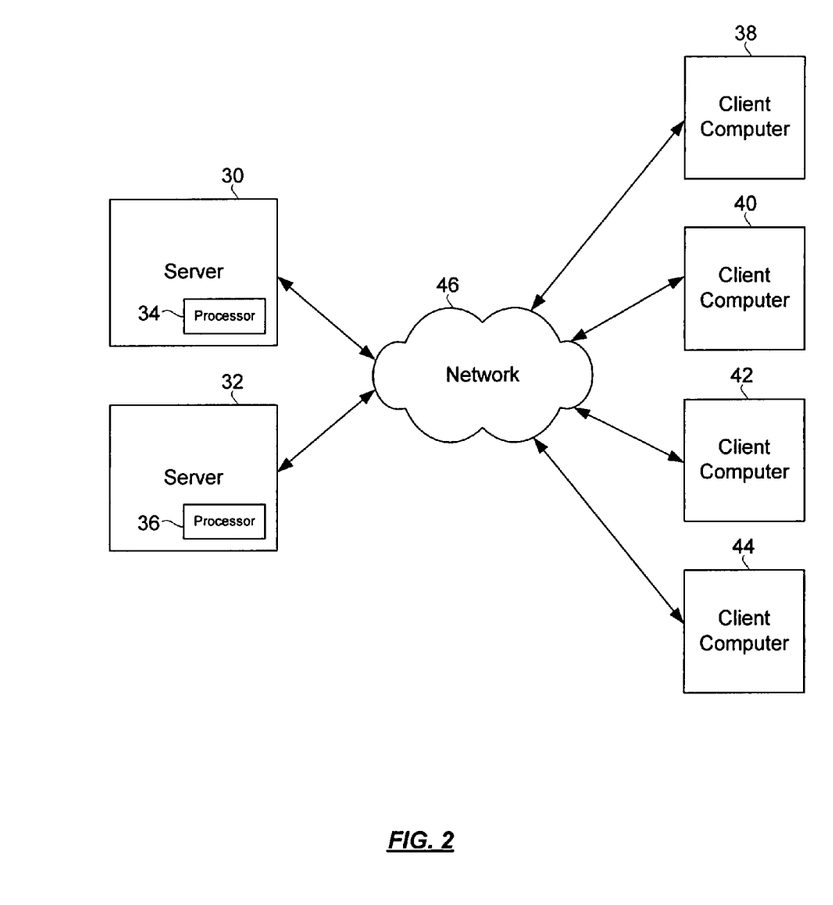
FIG. 2 shows a type of computer network.

In order to better meet increased networking demands, the "server" side of the client-server model shown in FIG. 1 may be implemented using any one of a variety of designs. For example, in FIG. 2, a "server" side of a computer network is implemented using server 30, 32 that each having a single processor 34, 36, respectively. Each single processor 34, 36 is capable of executing one thread at a time. Thus, the "server" side in FIG. 2 is capable of executing two threads at a time for the client computers 38, 40, 42, 44 connected to the servers 30, 32 over network 46. If a third thread is initiated while each of the processors 34, 36 is executing a thread, one of the threads being executed by the processors 34, 36 may be blocked in order to allow the third thread to be executed (dependent on, for example, priority of the third thread). Alternatively, the third thread may be forced to wait until one of the processors 34, 36 completes executing its respective thread.

Figure 3:
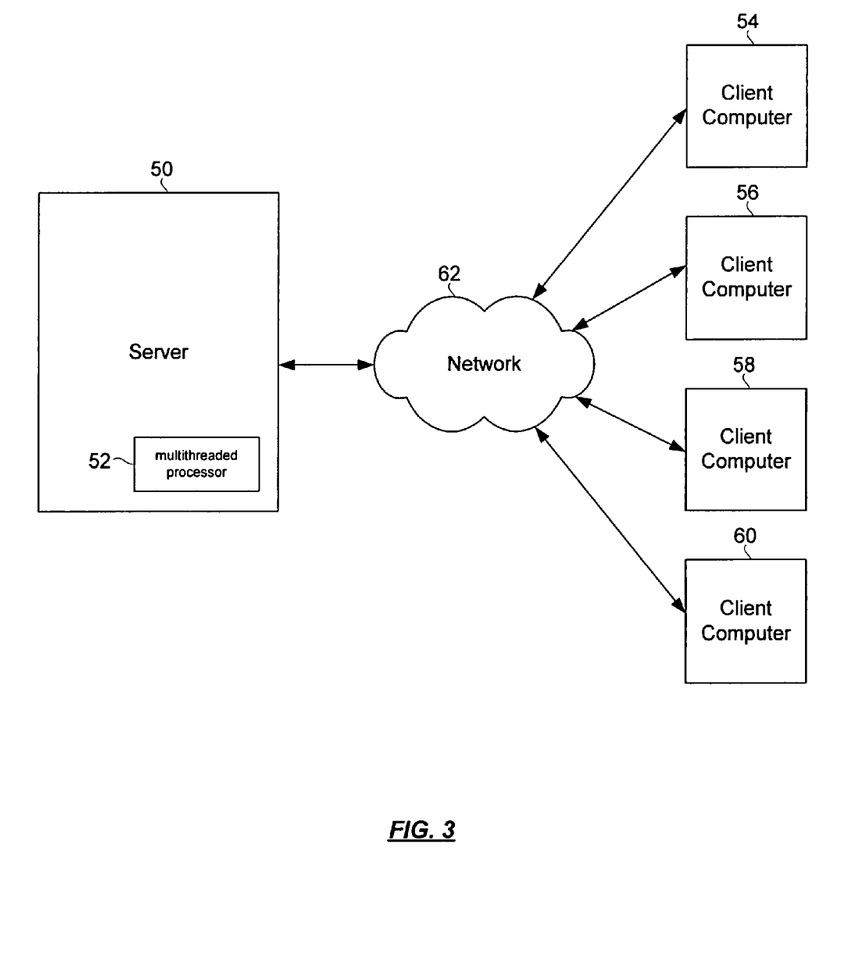
FIG. 3 shows a type of computer network.

In another type of design, for example, as shown in FIG. 3, a "server" side of a computer network is implemented using a server 50 that has a multithreaded processor 52. The multithreaded processor 52 is capable of executing a plurality of threads. Thus, if the multithreaded processor 52 supports the execution of x threads at a time, x threads may be executed at a time for the client computers 54, 56, 58, 60 connected to the server 50 over network 62. When a thread being executed by the multithreaded processor 52 stalls due to, for example, waiting for data from memory, another thread may be picked up and executed by the multithreaded processor 52.

Figure 4:
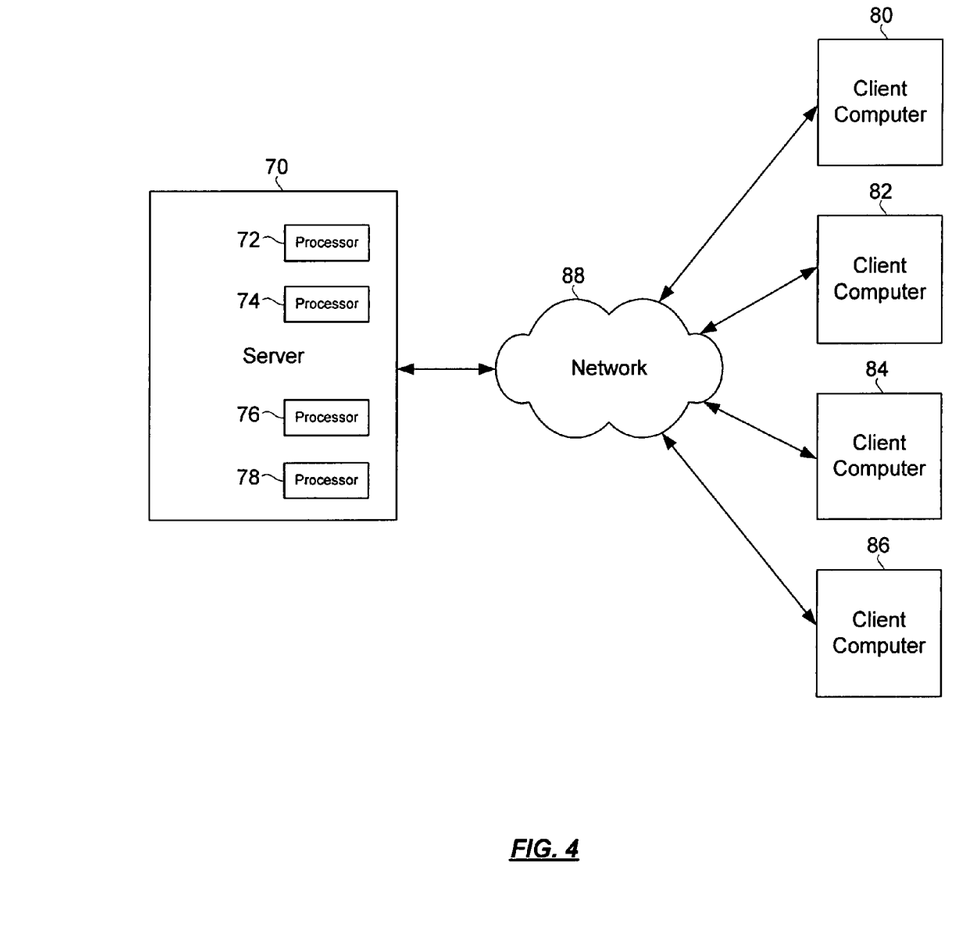
FIG. 4 shows a type of computer network.

In another type of design, for example, as shown in FIG. 4, a "server" side of a computer network is implemented using a multiprocessor server 70. The multiprocessor server 70 has a plurality of processors 72, 74, 76, 78 that are each capable of executing one thread at a time. Thus, in FIG. 4, the multiprocessor server 70 is capable of executing four threads in parallel for the client computers 80, 82, 84, 86 connected to the multiprocessor server 70 over network 88. Those skilled in the art will recognize that a symmetric multiprocessing (SMP) system is a type of multiprocessing system in which multiple threads may be executed in parallel. Although typical SMP processors only process one thread at a time, the greater number of processors in the SMP system relative to that of a non-multiprocessing system increases the number of threads that are executable in a given period of time.

Figure 5:
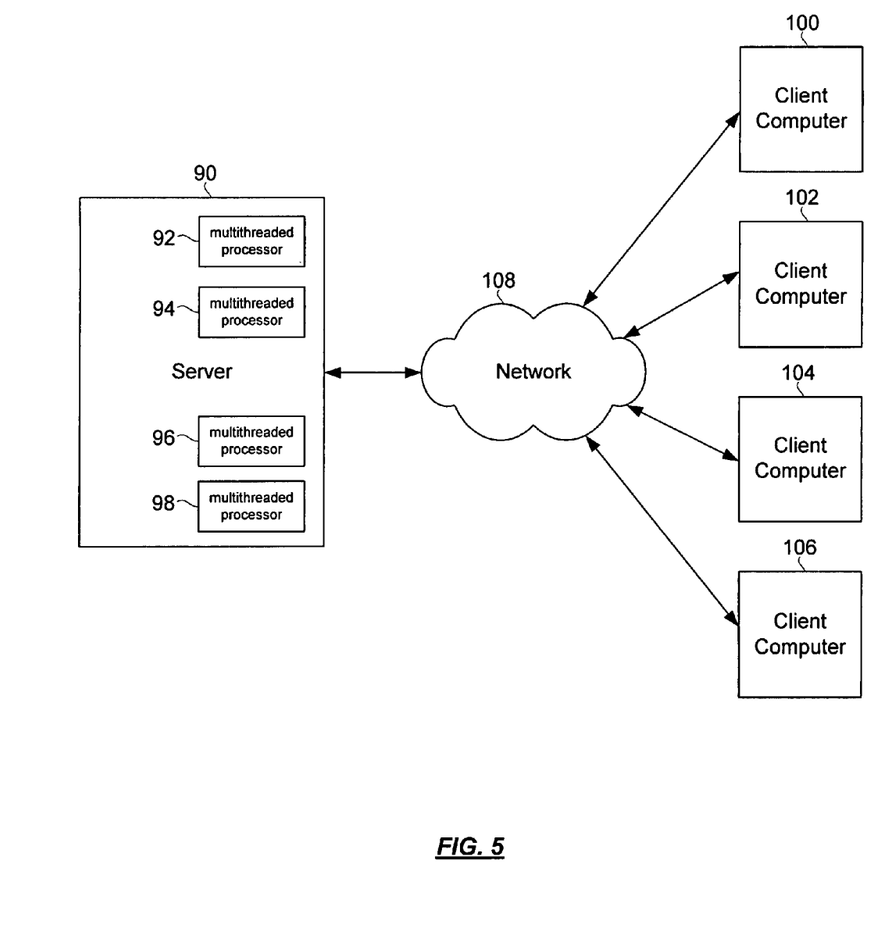
FIG. 5 shows a type of computer network.

In another type of design, for example, as shown in FIG. 5, a "server" side of a computer network is implemented using a multiprocessor server 90 that has a plurality of multithreaded processors 92, 94, 96, 98. Thus, if each of the multithreaded processors 92, 94, 96, 98 is capable of executing x threads at a time, the multiprocessor server 90 is capable of executing 4x threads at a given time for the client computers 100, 102, 104, 106 connected to the multiprocessor server 90 over network 108.

The execution of a software thread in any one of the types of processors described above with reference to FIGS. 2-5 occurs in a part of the processor known as the "core" (referred to and known in the art as "processing core"). The processing core is formed of a hardware execution pipeline and functional units (e.g., arithmetic units and load/store units) that actually perform the execution of a software thread.

In the case of a multithreaded processor as described above with reference to FIGS. 3 and 5, a scheduler, typically part of the operating system, selectively assigns multiple threads to a processing core of the multithreaded processor. Such a multithreaded processing core interleaves execution of instructions from multiple threads, potentially switching between contexts (i.e., switching between threads) on each cycle. A thread may become blocked when the thread encounters a long-latency operation, such as, for example, servicing a cache memory miss. When one or more threads are unavailable, the multithreaded processing core continues to switch among the remaining available threads. Those skilled in the art will recognize that for multithreaded workloads, such multithreading improves processor utilization and hides the latency of long operations.

SUMMARY OF THE INVENTION

According to one aspect of one or more embodiments of the present invention, a computer system comprises an integrated circuit having a plurality of processing cores fabricated therein and configured to perform operations in parallel, each processing core configured to process multiple threads, where a thread is assigned to one of the plurality of processing cores dependent on a cache hit rate of the thread.

According to another aspect of one or more embodiments of the present invention, a method of performing computer system operations comprises assigning a thread to one of a plurality of processing cores fabricated on an integrated circuit, each processing core configured to process multiple threads, where assigning the thread is dependent on a cache hit rate of the thread.

According to another aspect of one or more embodiments of the present invention, a computer system comprises: an integrated circuit; and memory comprising instructions executable on the integrated circuit, the instructions for assigning a thread to one of a plurality of processing cores fabricated on the integrated circuit, each processing core configured to process multiple threads, where the assigning is dependent on a cache hit rate of the thread.

According to another aspect of one or more embodiments of the present invention, a computer network comprises: a plurality of client computer systems; and a server computer system operatively connected to the plurality of client computer systems over a network, the server comprising an integrated circuit having a plurality of processing cores fabricated therein, each processing core configured to process multiple threads for the plurality of client computer systems, where each of the multiple threads is assigned for processing to one of the plurality of processing cores dependent on a cache hit rate of each of the multiple threads.

According to another aspect of one or more embodiments of the present invention, a method of performing computer network operations comprises: instantiating multiple threads for a plurality of client computer systems; and processing the multiple threads, where the processing comprises assigning threads to each of a plurality of processing cores fabricated on a single integrated circuit, where the assigning is dependent on cache hit rates of each of the multiple threads.

Other aspects and advantages of the invention will be apparent from the following description and the appended claims.

DETAILED DESCRIPTION

Figure 6:
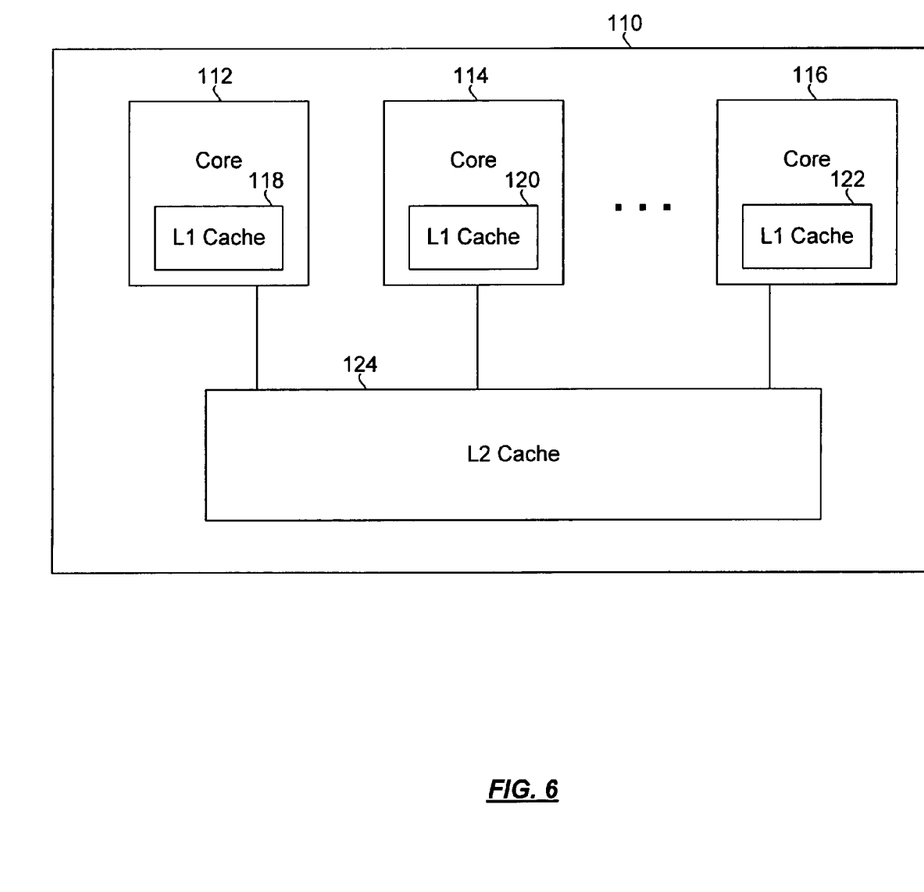
FIG. 6 shows a chip multithreading processor in accordance with an embodiment of the present invention.
Figure 7:
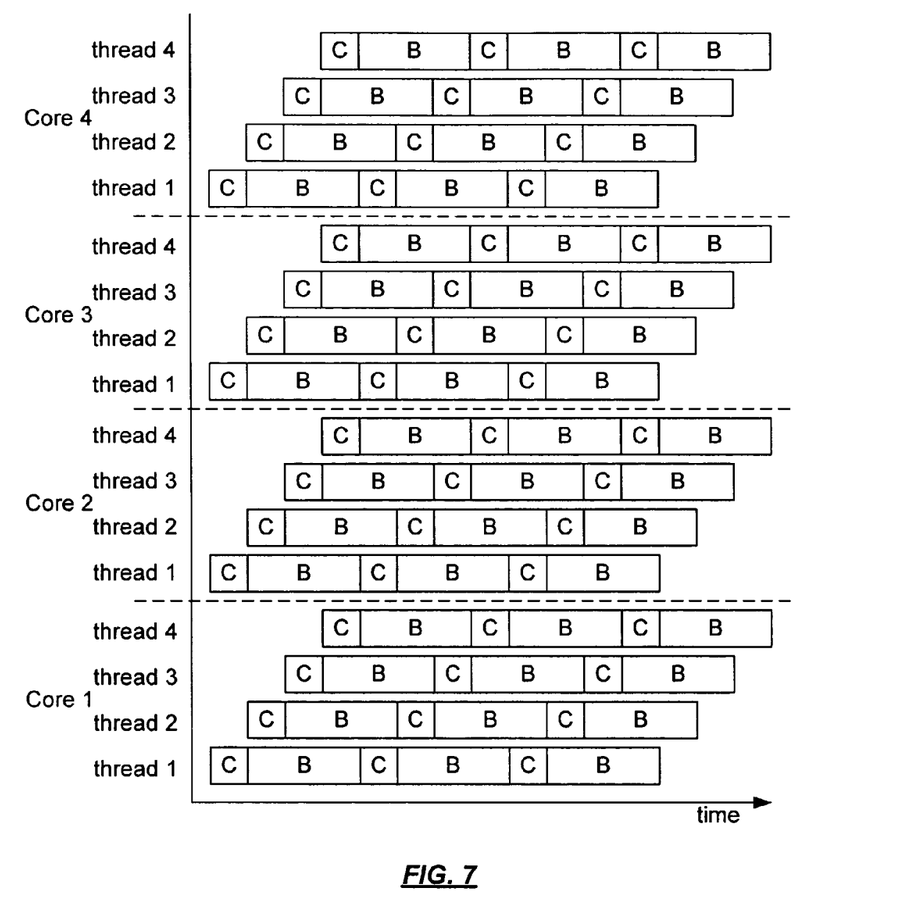
FIG. 7 shows a representation of thread execution in a chip multithreading processor.
Figure 8:
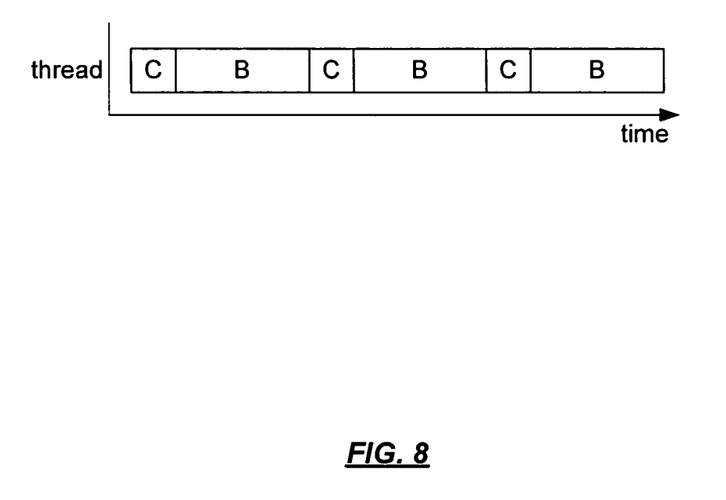
FIG. 8 shows a representation of thread execution in a single-threaded processor.
Figure 9:
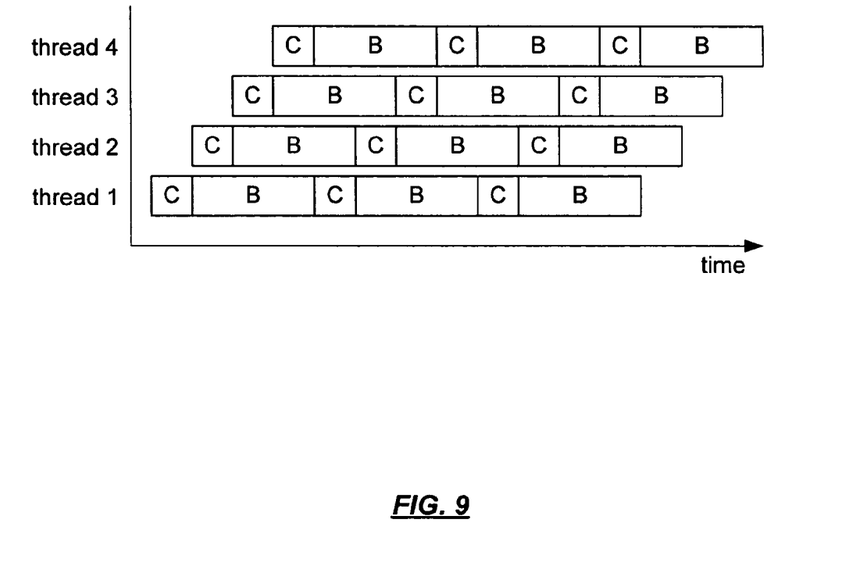
FIG. 9 shows a representation of thread execution in a processor having a single multithreaded processing core.

As shown in FIG. 6, an exemplary processor 110 in accordance with one or more embodiments of the present invention is formed of a plurality of processing cores 112, 114, 116, each being configured to execute multiple threads. Such a processor 110 is referred to as a "chip multithreading" processor. Thus, the chip multithreading processor 110 has multiple processing cores 112, 114, 116 fabricated on a single piece of silicon, where each processing core 112, 114, 116 is configured to execute multiple threads as shown in FIG. 7 (showing the processing of 16 threads by a single chip multithreading processor versus (i) the processing of one thread in a single-threaded processor as shown in FIG. 8 and (ii) the processing of multiple threads in a processor having a single multithreaded processing core as shown in FIG. 9, where C represents a computing event and B represents an event of blocking on memory or some other resource).

One factor to be considered in the design of a processor having multiple hardware contexts, such as with a chip multithreading processor, is operating system scheduling. Although a scheduling technique or scheduler design for a processor having a single multithreaded processing core may be applied to assign threads in a chip multithreading processor, one or more embodiments of the present invention relate to an improved scheduling technique (or scheduler) for assigning threads in a chip multithreading processor.

An ideal scheduler will assign threads to processing cores in a chip multithreading processor in a way that minimizes resource contention and maximizes throughput. The scheduler should be designed with an understanding how scheduling decisions will affect resource contention because resource contention ultimately determines performance.

The design of a scheduler to find good thread assignments requires an understanding of the causes and effects of resource contention among the threads that share a processing core. The mix of different types of instructions in a particular workload is an important factor in determining the level of contention for processor resources. When a thread performs a long-latency operation, the thread is blocked (i.e., the thread must wait for some event (e.g., a memory load) before execution can continue). Subsequent instructions to be issued by that thread are delayed until the blocked operation completes. Such delay is referred to as "instruction delay latency."

One group of resources of a chip multithreading processor that may be considered when scheduling threads relates to the cache memories of the chip multithreading processor. For example, with reference to FIG. 6, (i) the processing cores 112, 114, 116 of the chip multithreading processor 110 each have an L1 cache memory 118, 120, 122, respectively, and (ii) the processing cores 112, 114, 116 share an L2 cache memory 124.

In a chip multithreading processor, threads assigned to the same processing core share the L1 cache memory of that processing core. Therefore, when one or more "cache-greedy" threads (i.e., threads requiring a relatively large amount of space in the cache memory in order to achieve good throughput due to poor cache locality) are assigned to a processing core to which "cache-friendly" threads (i.e., threads requiring a relatively small amount of space in the cache memory in order to achieve good throughput due to good cache locality) are also assigned, execution of the "cache-friendly" threads may be significantly and adversely affected by the poor cache locality of the "cache-greedy" threads. In other words, "cache-greedy" threads may affect the performance of other threads assigned to the same processing core.

Accordingly, one or more embodiments of the present invention relate to a technique for scheduling threads based on whether the behavior of a thread is considered as being "cache-friendly" or "cache-greedy." The technique involves assigning "cache-greedy" threads to the same processing core and assigning "cache-friendly" threads to the same processing core. Thus, threads with different cache behaviors in this respect are not assigned to the same processing core. In other words, thread loads among the processing cores of a chip multithreading processor are assigned in an unbalanced manner with respect to the cache behavior of the threads.

Figure 10:
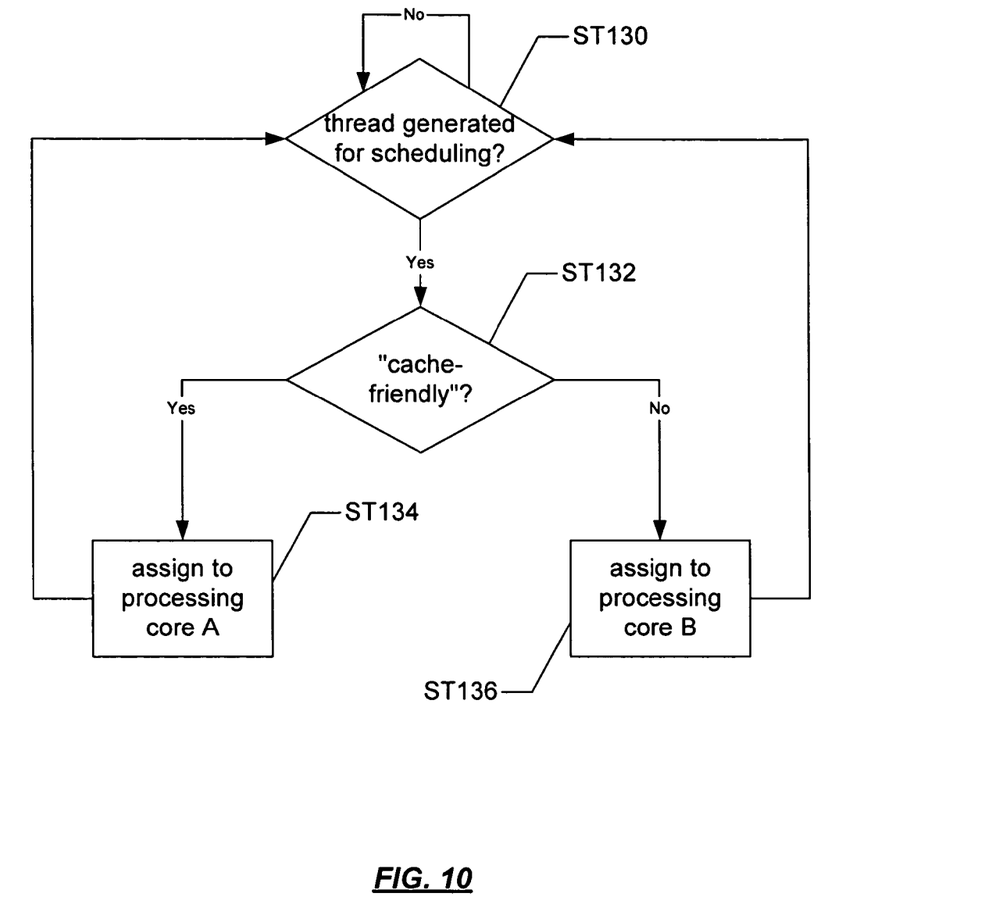
FIG. 10 shows a flow process in accordance with an embodiment of the present invention.

FIG. 10 shows an exemplary flow process in accordance with an embodiment of the present invention. If and when a thread is generated for scheduling ST130, a determination is made as to whether the thread is "cache-friendly" (in one or more other embodiments of the present invention, this step may involve determining whether the thread is "cache-greedy") ST132. If the thread is "cache-friendly," the thread is assigned to a first processing core ST134, and if the thread is not "cache-friendly," the thread is assigned to a second processing core ST136.

Those skilled in the art will understand that because "cache-greedy" threads typically achieve poor L1 cache hit rates, separately grouping and assigning "cache-greedy" threads and "cache-friendly" threads for scheduling purposes prevents, or at least reduces, the effects of the "cache-greedy" threads on the performance of the "cache-friendly" threads. Further, those skilled in the art will understand that although "cache-greedy" threads may hurt one another by being assigned together, because L1 cache sizes are relatively small, the cache hit rates of such "cache-greedy" threads would be poor even if such "cache-greedy" threads were assigned to a processing core also executing "cache-friendly" threads.

One or more embodiments of the present invention further relate to a technique for scheduling threads to improve an L2 cache hit rate of a chip multithreading processor. Referring again to FIG. 6, threads executing on the processing cores 112, 114, 116 of the chip multithreading processor 110 share the L2 cache memory 124. Because excessive contention for the L2 cache memory 124 may result in poor performance, it is important that multi-program workloads running on the chip multithreading processor 110 achieve good L2 cache hit rates.

In one or more embodiments of the present invention, a thread scheduling technique involves (i) setting an L2 cache hit threshold and (ii) ensuring that an aggregate cache hit rate of a group of threads running in any given time slice does not go below the L2 cache hit threshold. This may be achieved by estimating an aggregate L2 cache hit rate for groups of threads and scheduling only those groups that meet the L2 cache hit threshold. Further, in one or more embodiments of the present invention, such thread scheduling may occur while ensuring that no thread or only a relatively small number of threads is/are starved. Further, those skilled in the art will note that some amount of tolerance may be allowed with respect meeting the L2 cache hit threshold.

In one or more other embodiments of the present invention, a different measure, other than aggregate cache hit rate, may be used in scheduling threads to an L2 cache memory. For example, a thread scheduling technique may involve (i) setting an L2 cache hit threshold and (ii) ensuring that an average cache hit rate of a group of threads running in any given time slice does not go below the L2 cache hit threshold. Those skilled in the art will note that some amount of tolerance may be allowed with respect meeting the L2 cache hit threshold.

Figure 11:
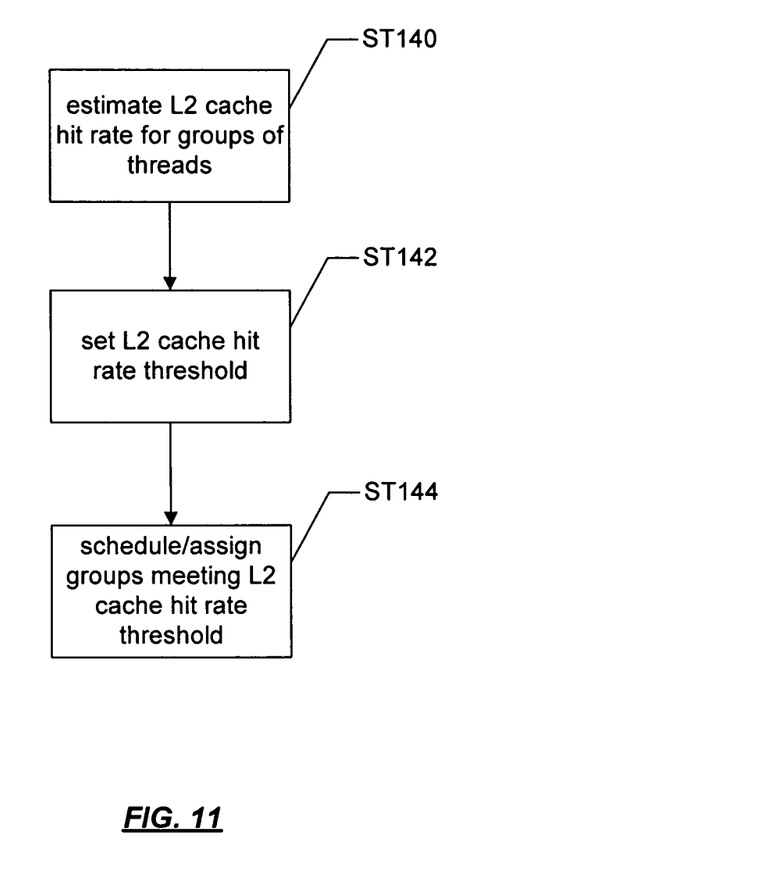
FIG. 11 shows a flow process in accordance with an embodiment of the present invention.

FIG. 11 shows an exemplary flow process in accordance with an embodiment of the present invention. First, using a model to assess the cache behavior of threads, the L2 cache hit rate for a group of threads is estimated ST140. Thereafter, an L2 cache hit rate threshold is set ST142. Those skilled in the art will note that, in one or more other embodiments of the present invention, ST142 may occur before ST140. Then, those groups of threads meeting the L2 cache hit rate threshold are scheduled ST144.

Advantages of the present invention may include one or more of the following. In one or more embodiments of the present invention, a scheduler that selectively assigns threads to processing cores in a chip multithreading processor may help improve throughput through the chip multithreading processor.

In one or more embodiments of the present invention, because a scheduler assigns threads to processing cores in a chip multithreading processor dependent on cache hit rates of threads, overall thread execution may be improved.

In one or more embodiments of the present invention, because a scheduler assigns a group of threads to a cache memory based on cache behavior of the group of threads, contention for the cache memory may be decreased.

In one or more embodiments of the present invention, because a scheduler that assigns threads to processing cores in a chip multithreading processor may help improve throughput through the chip multithreading processor, a likelihood of a thread being immediately processed upon becoming available may be increased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for thread scheduling on a chip multithreading processor (CMP), comprising:
    identifying an L2 cache hit threshold for an L2 cache of the CMP;
    estimating an aggregate L2 cache hit rate for a group of threads comprising a first plurality of threads and a second plurality of threads,
        wherein the first plurality of threads have a first plurality of cache memory space requirements (CMSR) corresponding to cache localities of the first plurality of threads, and
        wherein the second plurality of threads have a second plurality of CMSR corresponding to cache localities of the second plurality of threads;
    comparing the aggregate L2 cache hit rate with the L2 cache hit threshold;
    scheduling the group of threads in response to the L2 cache hit rate exceeding the L2 cache hit threshold, wherein scheduling the group comprises:
        comparing the first plurality of CMSR with a pre-defined threshold;
        assigning, in response to the first plurality of CMSR exceeding the pre-defined threshold, the first plurality of threads to a first processing core of the CMP;
        comparing the second plurality of CMSR with the pre-defined threshold; and
        assigning, in response to the second plurality of CMSR being less than the pre-defined threshold, the second plurality of threads to a second processing core of the CMP.

2. The method of claim 1, wherein estimating the aggregate L2 cache hit rate comprises:
    summing a first L2 cache hit rate of a first thread in the group and a second L2 cache hit rate of a second thread in the group.

3. The method of claim 1, wherein estimating the aggregate L2 cache hit rate comprises:
    averaging a first L2 cache hit rate of a first thread in the group and a second L2 cache hit rate of a second thread in the group.

4. The method of claim 1, further comprising:
    setting the L2 cache hit threshold for an L2 cache of the CMP.

5. The method of claim 1, wherein the first processing core and the second processing core are located on a server.

6. The method of claim 1, wherein the first thread is associated with a request from a first client.

7. The method of claim 1, wherein the second thread is associated with a second client.

8. A system for thread scheduling, comprising:
    a first processing core;
    a second processing core;
    an L2 memory comprising an L2 cache hit threshold;
    a scheduler configured to:
        estimate an aggregate L2 cache hit rate for a group of threads comprising a first plurality of threads and a second plurality of threads,
            wherein the first plurality of threads have a first plurality of cache memory space requirements (CMSR) corresponding to cache localities of the first plurality of threads, and
            wherein the second plurality of threads have a second plurality of CMSR corresponding to cache localities of the second plurality of threads;
        compare the aggregate L2 cache hit rate with the L2 cache hit threshold;
        schedule the group of threads on the first processing core and the second processing core in response to the L2 cache hit rate exceeding the L2 cache hit threshold, wherein scheduling the group of threads comprises:

comparing the first plurality of CMSR with a pre-defined threshold;
assigning, in response to the first plurality of CMSR exceeding the pre-defined threshold, the first plurality of threads to a first processing core of the CMP;
comparing the second plurality of CMSR with the pre-defined threshold; and
assigning, in response to the second plurality of CMSR being less than the pre-defined threshold, the second plurality of threads to a second processing core of the CMP.

9. The system of claim 8, wherein the scheduler is on a server and the first thread is associated with a request from a first client.

10. The system of claim 8, wherein the second thread is associated with a second client.

* * * * *